United States Patent [19]

Nishimura

[11] Patent Number: 4,646,886

[45] Date of Patent: Mar. 3, 1987

[54] DAMPER DEVICE OF A CLUTCH FOR A TORQUE CONVERTER

[75] Inventor: Sadanori Nishimura, Ohmiya, Japan

[73] Assignee: Honda Giken Kogyo Kabushiki Kaisha, Tokyo, Japan

[21] Appl. No.: 833,440

[22] Filed: Feb. 25, 1986

Related U.S. Application Data

[63] Continuation of Ser. No. 500,962, Jun. 3, 1983, abandoned.

[30] Foreign Application Priority Data

Jun. 21, 1982 [JP] Japan ............................. 57-91541[U]

[51] Int. Cl.$^4$ .......................... F16D 39/00; F16D 3/50
[52] U.S. Cl. .................................. 192/3.28; 192/106.2
[58] Field of Search ...................... 192/3.28, 3.29, 3.3, 192/3.31, 106.2; 464/62, 66, 67

[56] References Cited

U.S. PATENT DOCUMENTS

| | | | |
|---|---|---|---|
| 603,865 | 5/1898 | Whitaker | 464/62 X |
| 1,385,796 | 7/1921 | Roth et al. | 464/66 |
| 1,967,322 | 7/1934 | Pearmain | 192/55 X |
| 2,576,281 | 11/1951 | Carr | 464/62 X |
| 3,081,856 | 3/1963 | Wolfram et al. | 192/55 |
| 3,491,617 | 1/1970 | Konrad | 192/3.29 X |
| 3,497,043 | 2/1970 | Leonard | 192/3.3 |
| 3,691,792 | 9/1972 | Corwin et al. | 464/66 |
| 4,027,757 | 6/1977 | Radke et al. | 192/106.2 |
| 4,202,431 | 5/1980 | Yamamori et al. | 192/3.3 X |
| 4,240,532 | 12/1980 | Blomquist | 192/3.28 |
| 4,274,519 | 6/1981 | Moroto et al. | 192/106.2 |
| 4,289,048 | 9/1981 | Mikel et al. | 192/3.29 X |
| 4,289,220 | 9/1981 | Onuma et al. | 192/3.3 |
| 4,305,487 | 12/1981 | Sunohara | 192/3.28 |
| 4,437,551 | 3/1984 | Gimmler et al. | 192/3.28 |
| 4,466,311 | 8/1984 | Hiramatsu | 74/866 |

FOREIGN PATENT DOCUMENTS

| | | | |
|---|---|---|---|
| 621946 | 11/1935 | Fed. Rep. of Germany | 464/66 |
| 427063 | 4/1935 | United Kingdom | 464/66 |

*Primary Examiner*—Rodney H. Bonck
*Attorney, Agent, or Firm*—Armstrong, Nikaido, Marmelstein & Kubovcik

[57] ABSTRACT

The present invention is directed to a damper device for a torque converter. The torque converter comprises a casing, a turbine, a pump and a stator, an input shaft coupled to the pump through the casing, an output shaft coupled to the turbine a clutch plate slidably mounted on the turbine for frictional engagement with the casing, and a plurality of circumferentially extending springs for coupling the clutch plate to the turbine. The damper device comprises a support on the clutch plate for contacting the longitudinal surface of each of the springs and holdind the springs, the springs directly abutting the side surface of the clutch plate. End surface supporting members are coupled to the clutch plate for supporting the ends of each of the springs, the end surface supporting members being positioned in spaces between adjacent springs. Torque transmission members are mounted on the turbine and extend therefrom into the end surface support members, the torque transmission members engaging the end surface of the springs for transferring the rotation of the turbine to the springs and thereby to the clutch plate, wherein the fluctuations in torque between the turbine and clutch plate are dampened by the springs.

3 Claims, 5 Drawing Figures

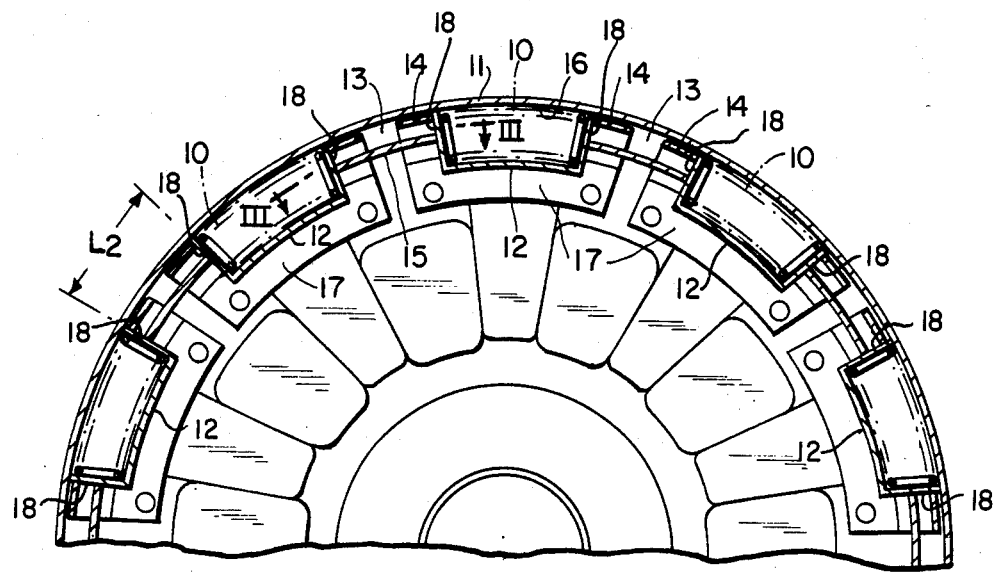
FIG. 2
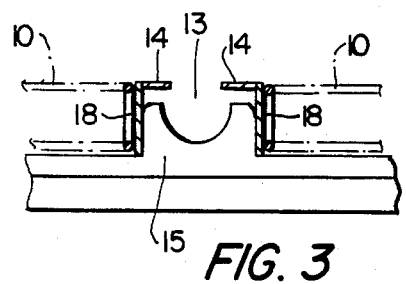
FIG. 3
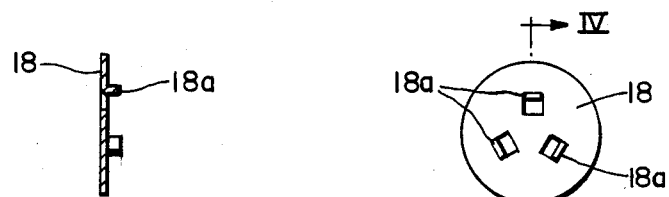
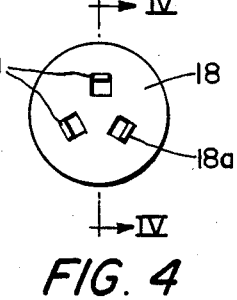
FIG. 5          FIG. 4

DAMPER DEVICE OF A CLUTCH FOR A TORQUE CONVERTER

This application is a continuation of application Ser. No. 500,962 filed June 3, 1983, now abandoned.

BACKGROUND OF THE INVENTION

1. Field of the Invention

The present invention relates to a damper device of a clutch for a torque converter, the damper device being housed inside a torque converter.

2. Description of the Prior Art

In prior art transmission torque converters such as shown in U.S. Pat. No. 4,240,532, a turbine inside a torque converter is positioned between a pump on one side opposing the turbine and an input case on the other side which connects the pump to an input shaft. The input shaft is connected to an output shaft through a clutch plate, which frictionally engages with the input case as it moves in the axial direction between the turbine and the input case. The clutch plate and the turbine are connected to each other via a plurality of circumferentially extending coil springs in a manner which allows relative rotation, so that the fluctuations in torque are absorbed by the springs when the clutch plate is engaged with the input case to connect the input case with the turbine.

In this prior art device, the springs are circumferentially arranged in pairs, each of which is housed in a pocket portion of a driving ring mounted on the clutch plate on the side of the turbine. The spring end surface supporting members, which are integral with the driving rings, are inserted in circumferential spaces between adjacent pocket portions while a torque transmission member extending from the turbine is positioned between paired springs in the respective pocket portions, thereby transmitting the torque via the springs. However, this prior art arrangement is disadvantageous in the following points:

(i) The axial dimension of the space for installing the springs between the clutch plate and the turbine is reduced by the thickness of the driving ring, which limits the diameter of each spring to a small value.

(ii) As the torque transmission member is placed at a circumferential position separate from that of the end surface supporting member, the total length of the springs that can be mounted on the driving ring is reduced by the length of the torque transmission member in addition to the length of the end surface supporting member.

(iii) As the diameter and the length of each spring is limited to by the reasons mentioned above in (i) and (ii), it is difficult to make the spring capacity large for enhancing the damper effect of the springs.

SUMMARY OF THE INVENTION

It is an object of the present invention to provide a damper device for a torque converter which dampens fluctuations in torque between the turbine and clutch plate.

It is a further object of the present invention to provide a damper device which permits the use of springs having a larger diameter than springs used in prior art damper devices.

It is still another object of the present invention to provide a damper device which permits the use of springs having a longer length than springs used in prior art damper devices.

The present invention is directed to a damper device for a torque converter. The torque converter comprises a casing, a turbine, a pump and a stator, an input shaft coupled to the pump through the casing, an output shaft coupled to the turbine, a clutch plate slidably mounted on the turbine for frictional engagement with the casing, and a plurality of circumferentially extending springs for coupling the clutch plate to the turbine. The damper device comprises a support on the clutch plate for contacting the longitudinal surface of each of the springs and holding the springs, the springs directly abutting the side surface of the clutch plate. End surface supporting members are coupled to the clutch plate for supporting the ends of each of the springs, the end surface supporting members being positioned in spaces between adjacent springs. Torque transmission members are mounted on the turbine and extend therefrom into the end surface support members, the torque transmission members engaging the end surface of the springs for transferring the rotation of the turbine to the springs and thereby to the clutch plate, wherein the fluctuations in torque between the turbine and clutch plate are dampened by the springs.

BRIEF DESCRIPTION OF THE DRAWINGS

FIG. 2 is a cross-sectional view taken along lines II—II in FIG. 1.

FIG. 3 is a cross-sectional view taken along lines III—III in FIG. 2.

FIG. 4 is a view of a spring side washer of the present invention.

FIG. 5 is a cross-sectional view taken along lines IV—IV in FIG. 4.

DETAILED DESCRIPTION OF THE PREFERRED EMBODIMENT

Figure 1:
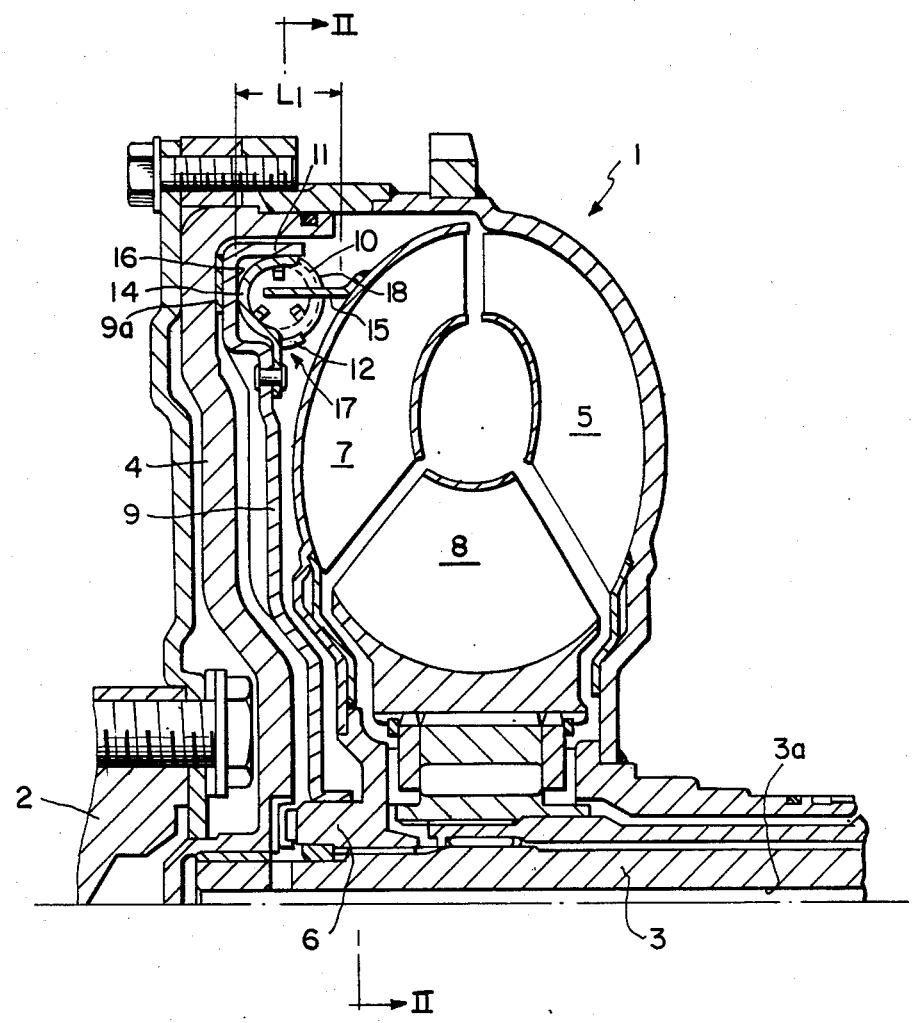
FIG. 1 is a cross-sectional view of torque converter of a preferred embodiment of the present invention.

Referring to FIGS. 1-5, the main body 1 of a torque converter is provided with an input shaft 2 connected to an engine, and an output shaft 3 connected to a transmission, on the front side and on the rear side respectively. The torque converter further comprises a pump 5 on the rear side, which is connected to the input shaft 2 by way of an input case 4 on the front side; a turbine 7 which is positioned between the input case 4 and the pump 5, and coupled to the output shaft 3 by a boss 6 formed on the inner periphery of the turbine 7; and a stator 8 interposed between the pump 5 and the turbine 7. Upon the rotation of the input shaft 2, the internal fluid is circulated through the three members 5, 7 and 8 to transmit the power to the output shaft 3. Further, a clutch plate 9 is slidably supported by the boss 6 and is movable in the axial direction between the input case 4 and the turbine 7. The clutch plate 9 and the turbine 7 are connected with each other in a manner to allow relative rotation therebetween by way of a plurality of circumferentially extending coil springs 10.

By reducing the fluid pressure in the space between the clutch plate 9 and the input case 4, for instance, within a high vehicle speed range, using a hydraulic control device (not shown) which is coupled to the space by way of an axial hole 3a formed in the output shaft 3, the clutch plate 9 is moved toward the input case 4 such that its front friction side surface 9a frictionally engages the case. As a result of the clutch engaging operation, the input case 4 is drivingly coupled to the turbine 7 by the clutch plate 9 and the springs 10, thereby preventing a reduction in the power transmission efficiency which would otherwise be caused by the circulation of the internal fluid, and absorbing the torque fluctuation by the relative rotation of the clutch plate 9 and the turbine 7 caused by the expansion and contraction of the springs 10.

The arrangement and operation as described above does not particularly differ from conventional devices. However, in the present invention, the clutch plate 9 is provided with outer supporting members 11 and inner supporting members 12 which radially hold the respective springs 10 therebetween from the radial outside and the radial inside when the springs 10 are in a position directly abutting on a side surface of the clutch plate 9, facing the turbine 7. End surface supporting members 14, each disposed in the space between adjacent springs 10, bear against an end surface of the spring 10. The end surface supporting members 14 each are shaped to receive a corresponding one of the torque transmission members 15 extending from the turbine 7 such that the torque transmission member 15 abuts against an end surface of the spring 10 at the location of the end surface supporting member 14.

The clutch plate 9 is formed on its outer periphery with an annular recess 16 projecting toward the input case 4. The outer wall of the recess 16 functions as the outer supporting member 11. Retainers 17 are mounted on the clutch plate 9 at a location radially inward from the recess 16 and are positioned corresponding to the respective springs 10. Each retainer 17 is integral with the inner supporting members 12 which supports the spring 10 from radial inside and also with the end surface supporting members 14 at ends of the spring 10. The end surface supporting member 14 has a substantially U-shaped cross section which opens toward the turbine 7. The torque transmission member 15, which is mounted on the turbine 7 and extends axially forward, is positioned in the space 13 between the springs 10, circumferentially extending over the end surface supporting members 14 of adjacent retainers 17, as shown in FIGS. 2 and 3.

A spring side washer 18 which, as clearly shown in FIGS. 4 and 5, is provided with a plurality of claws 18a engaging an end surface of its corresponding spring 10, thereby preventing uneven contacting of the torque transmission member 15 with the end surface of the spring 10 and deviation of the spring 10 from its proper position, which might otherwise occur when the torque transmission member 15 directly abuts on the end surface of the spring 10. Thus, uniform force application of the member 15 on the end surface is achieved.

The operation of the device according to the invention will now be described. Upon occurrence of fluctuations in the torque during operation of the clutch where the clutch plate 9 frictionally engages the input case 4, the torque fluctuation is absorbed by the expansion and contraction of the springs 10 between each end surface supporting members 14 which support one end of a corresponding spring and the associated torque transmission member 15 which abuts the end of the same spring. In this case, the greater the capacity of the springs, that is, the greater the diameter and the length of the springs, the more smoothly the fluctuation of the torque is absorbed and thus, the damper effect enhanced.

Further, according to the present invention, springs 10 are supported in a manner directly abutting against the side surface of the clutch plate 9 facing the turbine 7, which makes it possible to increase the axial dimension L1 of the spring-accommodating space between the clutch plate and the turbine 7, thereby reducing limitations on the diameter of the springs. Also, the torque transmission member 15 can be housed within the circumferential space between paired springs 10. The springs 10 have their total length extending along a substantially increased circumferential length of the clutch plate 9 except for the length L2 of the space 13. In addition, no further limitation is imposed on the length of the springs by the circumferential length of the torque transmission members 15. Thus, the diameter and the length of the springs can be increased as compared to the prior art and, therefore, the capacity thereof is increased, resulting in an enhanced damper effect.

A further increase in the diameter of the springs can be obtained by the provision of recesses 16 in the clutch plate 9 receiving springs 10. The recesses may be shaped to support the springs 10 with its inner peripheral wall, wherein the inner peripheral wall can form the inner supporting member 12.

According to this invention, the springs are supported in a manner directly abutting against the clutch plate and the torque transmission members are placed at the same circumferential positions as the respective end surface supporting members. This substantially alleviates limitations imposed in the prior art on the diameter and the length of the springs, thereby increasing the capacity of the springs as well as improving the damper effect.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A damper device for a torque converter, said torque converter comprising a casing, a turbine, a pump and a stator, an input shaft coupled to said pump through said casing, an output shaft coupled to said turbine, a clutch plate slidably mounted on said turbine between said casing and said turbine, said clutch plate being formed at its outer periphery with an annular, substantially U-shaped cross-section, recess opening at the turbine side of said clutch plate toward said turbine and having at the recess base on the casing side of said clutch plate and facing said casing a friction surface for frictional engagement with said casing, and a plurality of circumferentially end-to-end extending spring means in said clutch plate recess for coupling said clutch plate to said turbine, said damper device comprising:

(a) support means mounted on said clutch plate and extending into said recess portion for contacting the longitudinal surface of each inner side of said spring means and for holding said spring means on said clutch plate between said support means and the U-shaped walls of said recess at the turbine side of said clutch plate;

(b) means integrally formed on said support means for supporting the side surface and the end surfaces of each of said spring means, said end surface supporting means being positioned in spaces between adjacent spring means; and (c) torque transmission means mounted on said turbine and extending therefrom into said end surface support means, said torque transmission means engaging the end surface of said spring means for transferring the rotation of said turbine to said spring means and thereby to said clutch plate, wherein the fluctuations in torque between said turbine and clutch plate are dampened by said spring means.

2. A damper device as set forth in claim 1, wherein each of said spring means comprises a coil spring and a side washer positioned on each end of said spring, wherein said torque transmission means contacts said side washers.

3. A damper device as set forth in claim 2, wherein said washers include claw means for engaging the end of said springs.

* * * * *